July 9, 1940. P. T. FARNSWORTH Re. 21,504

IMAGE DISSECTOR

Original Filed April 26, 1933

INVENTOR
PHILO T. FARNSWORTH
BY Alvin S. Martin
ATTORNEY

Reissued July 9, 1940

Re. 21,504

UNITED STATES PATENT OFFICE 21,504

IMAGE DISSECTOR

Philo T. Farnsworth, Fort Wayne, Ind., assignor, by mesne assignments, to Farnsworth Television & Radio Corporation, Dover, Del., a corporation of Delaware Original No. 2,087,683, dated July 20, 1937, Serial No. 668,066, April 26, 1933. Application for reissue December 29, 1939, Serial No. 311,683

11 Claims. (Cl. 178—7.2)

My invention relates to transmitters of electrical impulses representing pictures, and particularly to tubes or photocells adapted, with their associated apparatus, to dissect a view to be transmitted into elementary areas, translating the illumination of these areas into successive electrical impulses which may be retranslated to reconstitute the picture.

Among the objects of this invention are: to provide a dissector tube having maximum sensitivity; to provide a tube wherein the entire emission of the photo-sensitive surface, over the entire time of use, is utilized to initiate the desired signals; to provide a tube of high vacuum characteristics, which does not depend upon ionization phenomena for its operation, and which therefore gives reproducible results and is highly stable in operation; to provide a tube which is both rugged and simple in construction; and to provide a transmitter for television signals which combines the advantages of the electrical image method of scanning as described in my prior Patent No. 1,773,980, issued August 26, 1930, with the advantages of those systems in which scanning is accomplished by means of a pencil of cathode rays, as in the hypothetical systems described by Campbell-Swinton.

Other objects of my invention will be apparent or will be specifically pointed out in the description forming a part of this specification, but I do not limit myself to the embodiment of my invention herein described, as various forms may be adopted within the scope of the claims.

Referring to the drawing.

Figure 1:
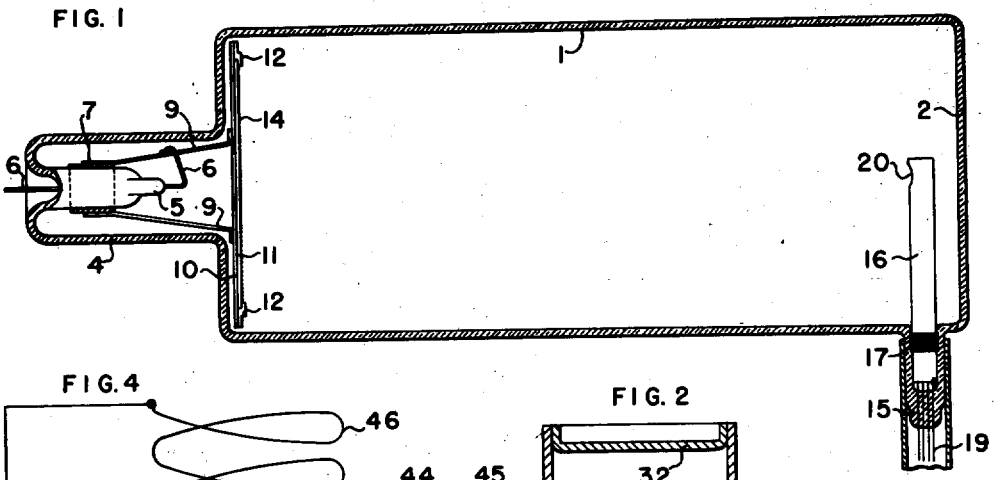
Figure 1 is a longitudinal sectional view of a television transmitting tube embodying this invention.

Considered broadly the apparatus of my invention comprises a photo-sensitive screen or plate having a surface formed of a large number of insulated areas, or "islands," of photoelectrically emissive material. This screen is so positioned as to permit an optical image of the view to be transmitted to be projected thereon. An electron gun is positioned to direct a stream of cathode rays against the islands of photo-sensitive material, and means are provided for deflecting the stream to scan the surface thereof, the stream being preferably concentrated so as to form an extremely small spot at its point of impact with the screen.

The potentials within the device are so adjusted that the cathode ray stream is decelerated as it approaches the plate, the velocity of the electrons actually reaching the plate being extremely small. In operation, the photoelectric islands constantly lose electrons in proportion to the light intensity of the portion of the image falling upon them, and consequently become constantly more positive. When the electron stream is directed against any individual island, the electrons neutralize the charge thus acquired, and the portion of the stream necessary to effect this neutralization is therefore absorbed by the screen. When the island under scansion has become as negative as the most negative portion of the electron gun, however, the electrons constituent of the stream are brought to rest before they reach the screen. Means are provided for directing this remaining portion of the stream into a work circuit.

The electron flow in the cathode ray beam as it approaches the screen is substantially constant. When any particular portion of the screen is under scansion, the number of electrons absorbed from the stream is equal to the total number lost by this portion due to photoelectric emission since last it was scanned. It follows that the unabsorbed portion of the stream varies in intensity in accordance with the illumination of the portion of the screen which it is scanning, thereby effectively modulating the unabsorbed portion with a picture current component.

In the preferred form of the device the stream of cathode rays is electrically focused in the plane of the screen, and the electron emission is reciprocally focused approximately in the plane of the electron gun. It follows that the unabsorbed portion of the stream is guided on its return path by the magnetic field in the same manner as the photoelectric emission from the screen, and the photo-emission may thus be guided into a path other than the work circuit so that the modulated stream is undiluted by the emission from those portions of the screen not under scansion.

The general form of a preferred embodiment of my invention is shown in the drawing. The envelope 1 is cylindrical in shape, one end of the envelope forming a window 2 which is substantially plane. From the other end of the cylinder extends a projection 4 of smaller diameter, carrying a reentrant stem 5 through which is sealed a lead wire 6. Encircling the stem 5 is a band 7 to which are welded struts 9, which are in turn fastened to the metal backing 10 of a photo-sensitive screen, supporting it at the end of the body of the tube, parallel to the window 2.

The screen itself comprises a thin sheet 11 of insulating material, which is preferably of mica, but which may be of glass, enamel, or any other good insulator, preferably having a high dielectric constant. In the screen shown, the insulating layer is of mica, which is secured to the metal backing by clips 12.

The sensitive surface 14 which is carried by the face of the screen comprises an extremely large number of small, discrete insulated areas or islands of photoelectrically emissive material. Such a surface may be prepared in a number of ways. In one method of forming the screen a sheet of extremely fine wire gauze is placed over the face of the mica sheet 11, and silver is evaporated on to the sheet through the gauze. When the gauze is removed there remains upon the mica the layer of silver covering those portions which were exposed through the openings of the gauze, separated by the uncoated lines where the mica was protected by the wires.

With the screen thus prepared, when a tube is ready for evacuation it is pumped and baked in the usual manner, and is then filled with electrolytic oxygen while hot and allowed to cool with the oxygen in the tube. A definite amount of caesium is then distilled into the tube, which is heated to a temperature of approximately 220° C. Readings of the photoelectric current are then made, and at a definite point the tube is allowed to cool. If the correct amount of caesium has been admitted to the tube, no short circuiting of the silver islands occurs, but if an excess of caesium has been admitted small amounts of oxygen are admitted into the tube, spoiling its sensitivity. The sensitivity recovers gradually and the process is then repeated until the shorting of the islands is eliminated. With the proper amount of caesium admitted in the first instance, its condensation occurs only on the silver islands, and the insulation elsewhere within the tube remains substantially perfect.

Another method of forming a screen of the required character comprises first coating the mica with a powder of high insulating characteristics, such as powdered willemite. The silver backing may then be evaporated directly onto the roughened surface thus formed, and substantially no shorting will occur between the silver particles deposited on the powdered surface. This is evidenced by the fact that the same amount of silver which, evaporated onto a smooth surface, gave a resistance of approximately three ohms, when evaporated onto the powdered surface gave a resistance of $5\times10^8$ ohms. The remaining treatment of this screen may be the same as that given to the gauze-formed islands.

In the other end of the tube, adjacent the window 2, there is formed a laterally projecting stem 15. This stem surrounds and supports a tubular finger 16 which projects inwardly to the axis of the envelope, and is cushioned from the stem 15 by a ring 17 of wire gauze. A lead 19 is connected to the shield and sealed out through the stem. An aperture 20 is formed in the end of the finger facing the screen.

Behind the aperture and directed through it is an electron gun comprising a circular anode 21 perforated with an axial beam-canal 22, behind which is located thermionic cathode 24. Anode and cathode are supported by leads 25, 26, and 27, which are sealed through the ends of a tubular glass support 29 fitted within the shield 16. The ends of the leads are sealed out through the stem 15. Electron flow between the cathode 24 and the wall of the finger 16 is prevented by a small cup-shaped shield 30, supported by the cathode lead 27, and preferably maintained at the potential of the most negative portion of the cathode. The aperture 20 is covered by a screen 31 of fine mesh metal gauze, and the end of the finger is closed by a cap 32.

Figure 4:
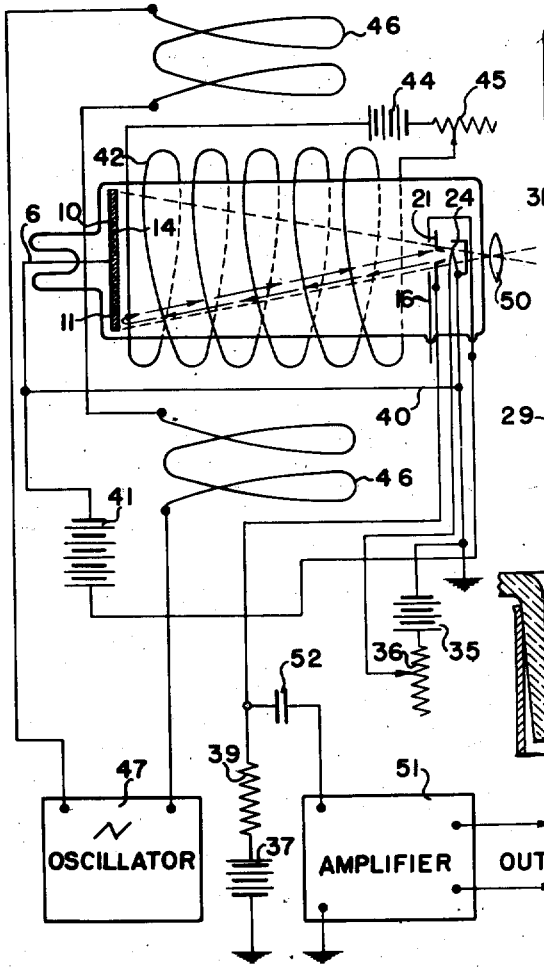
Figure 4 is a schematic diagram of the tube and its associated circuits.
Figure 2:
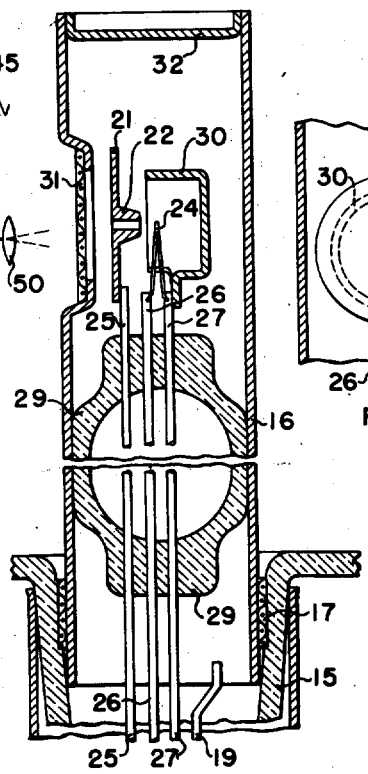
Figure 2 is a sectional view, on a greatly enlarged scale, of the combined electron gun and target employed in the tube of Figure 1.
Figure 3:
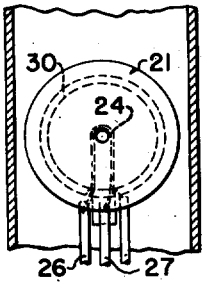
Figure 3 is a fragmentary elevational view of the electron gun and target illustrated in Figure 2, the shield surrounding this portion of the device being shown in section.

The connections of the device are shown in the diagram of Figure 4. The cathode 24 is heated to emitting temperature by current supplied from a battery 35, regulated by a rheostat 36. A battery 37 or other source of supply maintains the anode 21 at a potential positive to the cathode, preferably from 20 to 50 volts, connection to the anode from the battery being made through the output resistor 39. A lead 40 connects with the lead 6 and so to the plate 10 which backs the photo-sensitive screen, this plate being therefore maintained at cathode potential, and a high potential source 41 is connected between the cathode and the finger 16, through the lead 19, maintaining the finger from 500 to 1,000 volts positive with respect to the cathode.

Surrounding the entire tube is a solenoid 42, which is supplied with a constant direct current from the battery 44, this current being adjustable by means of a rheostat 45.

Placed on each side of the tube, with their axes perpendicular to the axis of the solenoid 42, is a pair of deflecting coils 46. These coils are supplied with scanning current through an oscillator 47, which preferably generates a scanning wave of saw-tooth form, and at picture frequency—say 16 to 24 cycles in ordinary practice, although very much higher frequencies may be used if desired. A similar set of deflecting coils is also arranged perpendicular to those shown, to effect the transverse scanning of the picture field, but as these deflecting coils and the oscillator which supplies them differ from those shown fundamentally in frequency only, they are omitted from the drawing in order to prevent confusion. The frequency of this second deflecting system may be from 200 to 500 times that of the oscillator 47 in ordinary practice, giving from 200 to 500 scanning lines in the resultant picture.

In operation, the image of the view to be transmitted is projected upon the photo-sensitive surface 14 by a suitable lens system, typified in the schematic diagram by the lens 50. As a result, the various islands or particles of photo-sensitive material at once begin to emit electrons in proportion to their illumination, these electrons being at once attracted to the finger 16 by the high voltage field. Owing to the small amount of such photoelectric emission, and to the high voltage employed, saturation conditions exist, and no effective space charge is built up adjacent the screen 14. The loss of electrons causes each of the discrete particles forming the surface to acquire a positive charge, but owing to the relatively large capacity between the particles and the back-plate 10 the acquisition of this charge is accompanied by a very small rise in potential, in operation the difference in potential between the particles and the back-plate being a few volts at most, even under the most extreme conditions.

The electron streams from the particles are focused by the magnetic field of the solenoid 42 in the plane of the aperture 20, forming an electrical image in this plane as has been described in my previous application, Serial No. 270,673, filed April 11, 1928, now matured into U. S. Patent No. 1,986,330, and others. This image is deflected over the aperture 20 by the vertical and transverse deflecting fields generated by the scanning oscillators typified by the oscillator 47, only a relatively small portion of the electrons constituting the image entering through the gauze 31 to strike the anode 21.

Riverting now to the electron gun, electrons from the cathode are accelerated by the anode, the greater portion of them passing through the beam canal 22 to form a beam of cathode rays having a velocity corresponding to 50 volts. Upon emerging from the beam canal the stream of rays thus formed is further accelerated to a 1,000 volt velocity by the potential of the gauze 31, and enters the body of the tube traveling at this high velocity. As the stream continues toward the sensitive screen, however, it is decelerated by the potential gradient through which it is traveling, arriving at the surface of the screen with nearly zero velocity, this velocity depending upon the potential of the particular photo-sensitive islands against which it is directed.

Electrons from the beam at once neutralize the positive charges upon the islands, bringing them substantially to zero potential, after which the remainder of the electrons are repelled, and, as they are within the field of the finger, are at once accelerated in the reverse direction toward the finger.

The main velocity of the stream of cathode rays from the electron gun to the screen, and the photo-cathode rays from the screen back to the finger, is the same. It follows that when the focusing field is properly adjusted to focus the electrical image of the screen in the plane of the aperture, it is also adjusted to form an electrical image of the source of the cathode ray stream in the plane of the screen. Furthermore, the portion of the stream which is repelled by the screen is subjected to conditions which are almost exactly similar to those of the photo-emitted radiation from the screen, and is therefore also focused in the plane of the aperture.

A like reciprocal relation also holds with regard to the deflecting field, that is, the cathode ray beam is directed by the focusing and deflecting field toward that portion of the sensitive screen whose emission is simultaneously being directed through the aperture, and that portion of the stream which is not neutralized or absorbed by the charges on the screen is returned along almost the same path back to the finger and through the aperture 20. An extremely small portion is, of course, intercepted by the gauze 31, but the remainder passes on and strikes the face of the anode 21. Since this portion is traveling against the potential gradient between the gauze and the anode it is decelerated, so its velocity of impact against the anode is only that due to the voltage difference between anode and cathode. By control of this potential secondary emission of electrons may be either promoted or suppressed, and hence either primary or secondary emission may be utilized to establish the picture current.

The operation of the apparatus will now be clear. Each particle on the surface of the sensitive screen is constantly emitting electrons, and thereby acquiring a positive charge. At the same time the stream of cathode rays is scanning the surface of the screen. When the stream arrives at the screen it neutralizes the positive charges on those particular islands which are under scansion at the moment, leaving the unneutralized portion to return to the anode, the neutralized or absorbed portion of the rays being substantially equal to the total number of electrons emitted by the islands since last they were scanned. Since the scanning intervals are equal, the variations in the return beam are directly proportional to the variations in the emission of the successive particles that the beam traverses, integrated over the entire period between scansions.

Those electrons reaching the anode pass through the output resistor 39 and thence back to the cathode, completing the circuit. An amplifier 51 is coupled across the output resistor through the blocking condenser 52, the amplifier feeding any conventional type of output circuit, such as a line or radio transmitter.

Several features of the device deserve further comment. It is to be noted, for example, that the apparatus is fully operative if the metal back-plate 10 of the sensitive screen be omitted. The plate is desirable in order more quickly to establish operating conditions, and to reduce the potential differences effective on the screen, but even if it be omitted, scansion of the screen by the cathode ray beam will eventually cause the accumulation of a negative potential sufficient to bring the stream to rest and repel it, after which the loss of electrons and neutralization of a portion only of the beam will occur in manner similar to that obtaining when the back-plate is present. Furthermore, inequalities in the insulating layer are not important. It is the total number of electrons lost by the individual islands which determines the proportion of the stream which is absorbed, and not the potential gained by the loss of those electrons. Hence a difference of several hundred per cent in capacity as between the various islands has no material effect. The chief value of the back-plate is to minimize potentials and potential differences, thus reducing leakage through the insulator to a minimum, and causing minimum aberrations in the magnetic focus due to variations in velocity of the electron stream at its point of impact.

The fact that the photo-electrons emitted by the screen are guided by the focusing field and, with the exception of a small area surrounding that immediately under scansion, are prevented from reaching the anode, is valuable in that it prevents variable dilution of the return stream which would mask its modulation. A constant amount of dilution of the stream is not important, since the blocking condenser 52 filters out the entire direct current component, and it is only the variable component which is amplified.

Should it be desired also to eliminate constant dilution due to a flow of electrons directly between the cathode 24 and the anode 21, it is obviously possible to separate the projecting portion of the anode carrying the beam canal and the annular rim or target of the anode. In practice, however, this is not found to be justifiable in view of the additional complication involved, slight though this may be.

I am aware that many previous efforts have been made to accomplish scansion by means of a stream of cathode rays, but although various methods of so doing have been proposed they have all differed fundamentally from the present invention. Thus, Schoultz, in his French patent, has shown the use of a cathode ray stream to scan a photoelectric surface, utilizing increased secondary emission of photoelectric materials when under illumination to develop his picture current. In my invention the velocity of the stream as it approaches the screen is so low that substantially no secondary emission of electrons occurs, and the number of electrons returning from the screen is decreased with increased illumination instead of being increased thereby as in Schoultz's device.

Other inventors have used space charges established by photoemission to modulate an electron stream passing therethrough, whereas in my invention no space charges are established and actual absorption or neutralization of the electrons forming the stream causes modulation. Still other inventors have used an electron stream to establish a conducting path between isolated islands of photo-emissive material and a back-plate, relying on the liberation of space charges through the establishment of such a path for their picture current, the picture current being formed entirely from photo-electrons or from ionization caused by their liberation. In the present invention the photo-electrons themselves do not enter into the picture current, which is negative in sign in comparison to a direct photoelectric current, no physical conduction occurs to the back-plate, and ionization is rigorously avoided.

The tube is remarkably stable in operation due to the factors already mentioned. Furthermore, the entire photo-emission of the screen, during the entire time, is effectively utilized. Were direct photo-emission used, each elementary area would be active to produce the picture only during the period when it was under scansion. In a 320 line picture, this period would be aproximately one one hundred thousandth of the total time, its emission during the rest of the time being wasted. In the present invention its emission during the time when it is not under scansion is effectively stored, and its integrated effect is made available at the instant when it is contacted by the beam. The remaining theoretical gain in efficiency is a factor of one hundred thousand. Actually, owing to the fact that portions of the screen are non-emissive, and that a portion of the return stream is absorbed by the gauze 31, the factor is not this great, but it is still large in comparison with tubes of other types.

I claim:

1. The method of generating a signal representing a picture which comprises the steps of forming an optical image of the view to be transmitted and projecting said image on a photoelectric surface to form a photoelectric discharge, said discharge forming a charge image over said surface corresponding to the optical image focussed thereon, accelerating said discharge in one direction, discharging and so directing a defined beam of cathode rays of elemental cross section as to effect its passage through said photoelectric discharge in the opposite direction so that less secondary electrons are emitted from said photoelectric surface than primary electrons impact the same, establishing a magnetic field longitudinally of both of said discharges to form electrical foci of the source of said discharge of said cathode ray beam in the plane of the other discharge, deflecting said beam to scan said charge image, and utilizing the effects produced by the scanning of said charge image to develop a picture signal.

2. The method of scanning a differentially illuminated photo-emitting surface with a defined cathode ray beam of elemental cross section which includes the step of directing the entire photoelectric discharge from said surface coordinately with said beam along reversed paths substantially parallel to said beam, whereby the discharge from the element of said surface under scansion at a given instant is substantially undiluted by discharges from other elements of said surface, and collecting only such electrons as are traveling away from said surface from the direction of the point under scansion by said beam to form a signal current.

3. The method of scanning an image on a photoelectric surface which includes the steps of directing a stream of cathode rays toward said surface, decelerating said stream by the charges accumulated on the surface from the stream, accelerating that portion of the stream not contributing to said charges to form a reverse stream, and deflecting said first stream to scan said surface with the first stream and thereby modulate the reverse stream with a picture signal component, and coordinately deflecting said reverse stream along a path substantially parallel with said first stream.

4. The method of producing a signal current representing a picture to be transmitted which includes the steps of establishing a surface of base potential, photoelectrically establishing discrete positive charges forming a pattern dependent on the picture to be transmitted in a second surface adjacent and substantially parallel to said base potential surface, liberating a substantially constant supply of electrons at a position spaced from said surfaces and substantially at said base potential, accelerating said electrons by a potential materially above said base potential to form a clearly defined stream of cathode rays directed against said discrete charges, scanning said discrete positive charges with said stream of cathode rays to decelerate to zero velocity a portion of said stream dependent upon the charges against which it is directed, reaccelerating said decelerated portion of said stream in a new direction to form a second clearly defined stream modulated in accordance with said discrete positive charges, and utilizing the effects of said scanning of said discrete positive charges to develop a picture signal.

5. A transmitter of television signals comprising a screen of insulating material having discrete areas of photoelectrically emissive material on the face thereof, means for projecting an optical image of a scene to be transmitted on said face of said screen to establish discrete positive charges thereon corresponding to said optical image, an electron gun comprising a cathode and a perforated anode positioned to direct a stream of cathode rays against said face, means for deflecting said stream to scan said screen, and means for redirecting portions of said stream unabsorbed by said screen in the direction back to said anode, and means for utilizing the effect of the scanning of said screen to develop a picture signal.

6. A transmitter of television signals comprising a screen of insulating material having discrete areas of photoelectrically emissive material on the face thereof, means for directing a concentrated stream of electrons against said face with a velocity approaching zero at the point of impact therewith, and means for directing electrons approaching and leaving said screen in oppositely directed predetermined paths substantially coincident throughout their length.

7. A transmitter of television signals comprising an evacuated envelope, a screen of insulating material within said envelope having discrete areas of photoelectrically emissive material on the face thereof, an electron gun positioned to direct a stream of cathode rays against the face of said screen, and an electrostatic shield enclosing said electron gun and provided with an aperture to permit the passage of electrons between said gun and screen.

8. A transmitter of television signals comprising an evacuated envelope, a screen within said envelope adapted to receive an optical image of the picture to be transmitted on the face thereof and comprising an insulating body, a conducting back, and a photosensitive face of discrete elementary areas of photoelectrically emissive material, an electron gun within the envelope positioned to direct a stream of electrons against the face of said screen, means for directing electrons emitted from said screen back toward said electron gun, and means for preventing electrons from all of said screen with the exception of a limited area from reaching said electron gun.

9. A transmitter for television signals comprising an evacuated envelope having a window therein, a screen comprising insulated islands of photoelectrically emissive material positioned to receive an optical image projected through said window, an electron gun within said envelope comprising a cathode and an anode positioned to direct a stream of cathode rays against said islands, an electrostatic shield surrounding said gun and apertured to permit the passage of said cathode rays, means for deflecting said stream to scan said screen, means for establishing a magnetic field between said electron gun and said screen to guide said stream to said screen and return the portion of said stream unabsorbed by the screen through the aperture in said shield, and means for utilizing the portion of said stream returning through said aperture to initiate a signal current.

10. A transmitter for television signals comprising an evacuated envelope having a window therein, a screen comprising insulated islands of photoelectrically emissive material positioned to receive an optical image projected through said window, an electron gun within said envelope comprising a cathode and an anode positioned to direct a stream of cathode rays against said islands, an electrostatic shield surrounding said gun and apertured to permit the passage of said cathode rays, means for deflecting said stream to scan said screen, means for redirecting a portion of said stream unabsorbed by said screen through the aperture in said shield, and means for utilizing the portion of said stream returning through said aperture to initiate a signal current.

11. The method of scanning a photoelectric surface to produce a picture signal which comprises developing a charge image on the surface, corresponding to an optical image to be transmitted, developing a beam of electrons and directing said beam at the surface, decelerating said beam by the charges accumulated on the surface from said beam, scanning said charge image with said beam to vary in accordance with said charge image the portion of said beam utilized to accumulate said charges, accelerating that portion of said beam not contributing to said charges to form a reverse clearly defined stream of electrons, causing the reverse stream substantially to retrace the path of said beam, and utilizing the effect of the scanning of said charge image to develop a picture signal.

PHILO T. FARNSWORTH.